July 9, 1946.  W. B. BARNES  2,403,781
OVERDRIVE TRANSMISSION
Filed Oct. 24, 1940  3 Sheets-Sheet 1

INVENTOR.
William B. Barnes
BY
Hood & Hahn
ATTORNEYS

July 9, 1946.  W. B. BARNES  2,403,781
OVERDRIVE TRANSMISSION
Filed Oct. 24, 1940  3 Sheets-Sheet 2
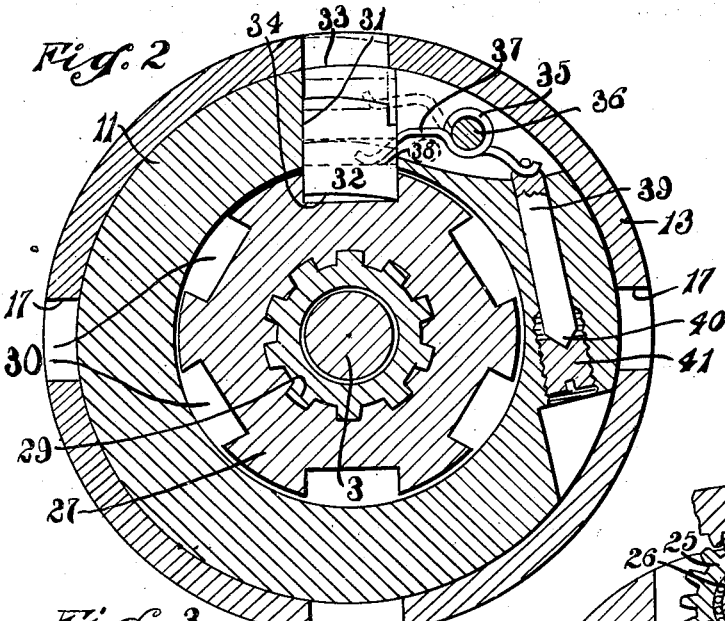
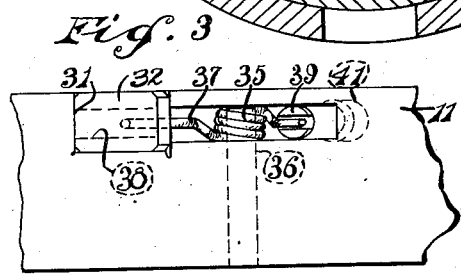
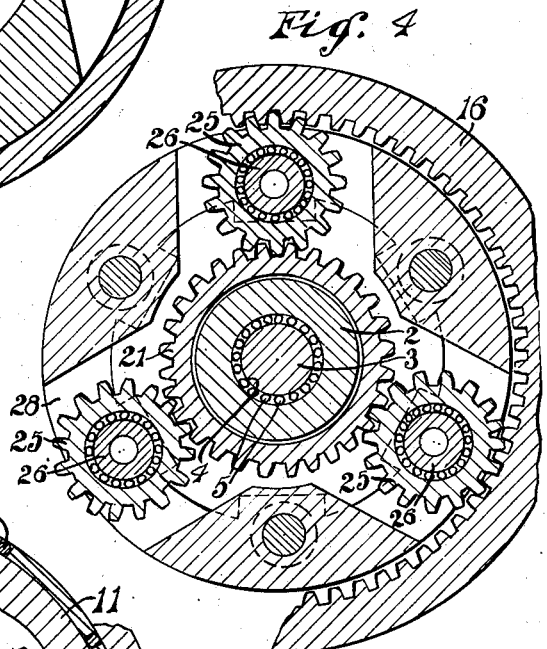
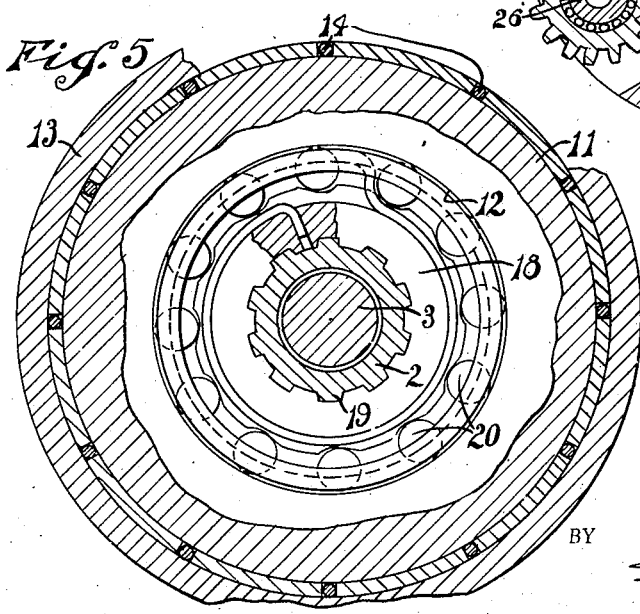
INVENTOR.
William B. Barnes,
BY Hood & Hahn
ATTORNEYS

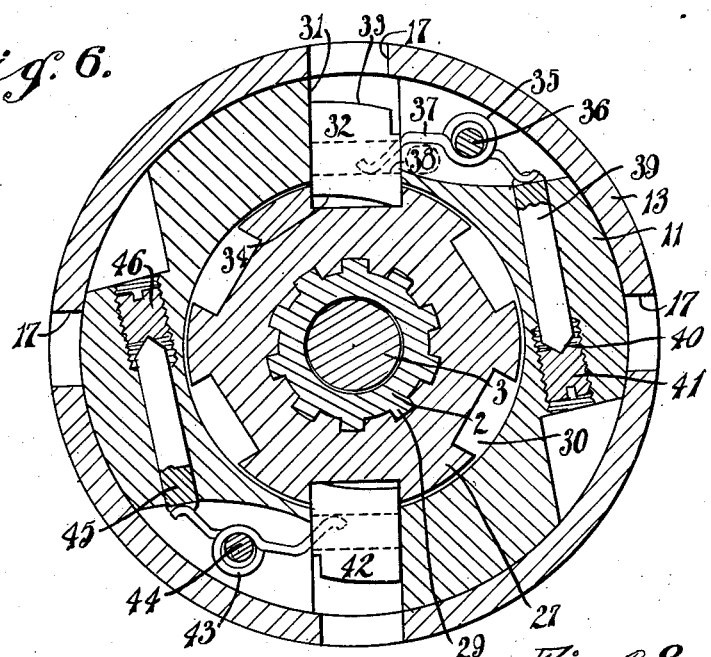
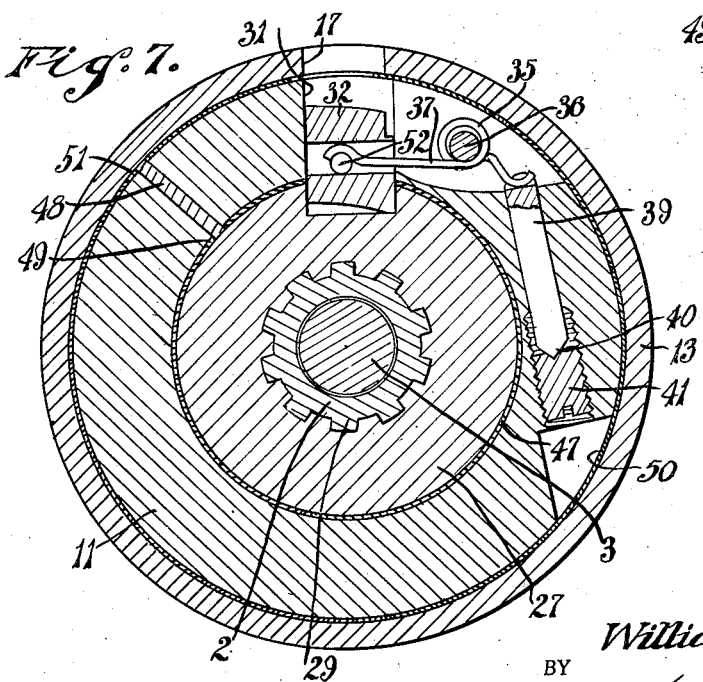

Patented July 9, 1946

2,403,781

UNITED STATES PATENT OFFICE 2,403,781

OVERDRIVE TRANSMISSION

William B. Barnes, Muncie, Ind., assignor to Barnes Motor Developments Company, Muncie, Ind., a partnership Application October 24, 1940, Serial No. 362,497

32 Claims. (Cl. 74—260)

My invention relates to improvements in transmission gearing, particularly transmission gearings for use in connection with self-propelled vehicles; and has, for one of its objects, the provision of a speed-changing transmission gearing which shall be automatically thrown into operative relation with the driving and driven shafts when one of said shafts reaches a predetermined speed.

More specifically, my invention relates to an improvement in a speed-changing gearing of the planetary gear type, which shall drive the driven shaft, when certain predetermined conditions arise, at a greater speed than that of the driving shaft.

It is an object of my invention to provide a structure having the characteristics above disclosed, which will reduce the cost of construction and assembling of the various parts thereof to a minimum.

For the purpose of disclosing my invention, I have illustrated an embodiment thereof in the accompanying drawings, in which Fig. 1 is a side elevation, partially in section, of a transmission embodying my invention;

Fig. 2 is a transverse section, taken on the line 2—2 of Fig. 1;

Fig. 3 is a detailed plan view of a means for adjusting the speed at which the gearing throws into operation;

Fig. 4 is a partial transverse section on the line 4—4 of Fig. 1;

Fig. 5 is a section on the line 5—5 of Fig. 1;

Fig. 6 is a view similar to Fig. 2, illustrating a modification of the invention shown in Figs. 1, 2 and 5;

Fig. 7 is a view similar to the view illustrated in Fig. 2, illustrating an additional modification; and Fig. 8 is a perspective view of one of the blocking rings illustrated in Fig. 7.

Figure 1:
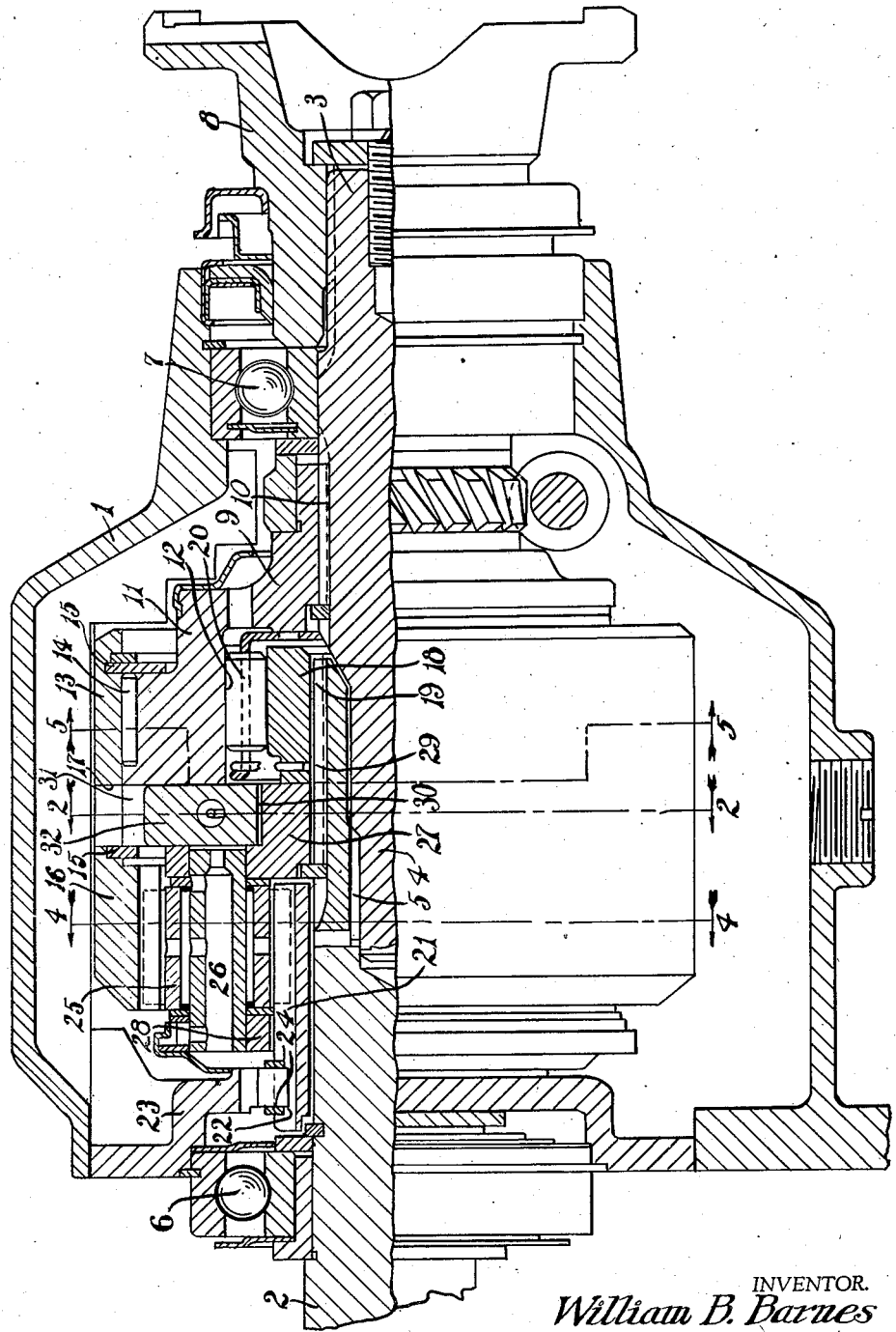

In the embodiment of the invention illustrated, a casing 1 is provided, into which is projected, in axial alignment, a driving shaft 2 and a driven shaft 3. The driven shaft is preferably piloted, as at 4, in the driving shaft, suitable anti-friction rollers 5 being interposed between the two shafts. Suitable ball bearings 6 and 7 are provided in the ends of the casing for the respective shafts 2 and 3, and the driven shaft is provided with the usual coupling 8 for connecting the same to the propeller shaft of the vehicle.

Within the casing and on the shaft 3, I mount a head 9 which is splined to the shaft 3, as at 10, so that the head may be rotatively fixed on the shaft. This head 9 has an overhanging portion 11, on the inner face of which is formed one memmber 12 of an overrunning clutch. Rotatively mounted on the head 9 is a ring gear member 13, having interposed therebetween and the head, anti-friction rollers 14, and held against axial displacement on the head by suitable expansion rings 15—15. The overhanging portion of this ring gear member 13 is provided with a ring gear 16 of a planetary gearing, and this overhanging portion is also provided with a series of notches or openings 17 forming one portion of a dog clutch.

Another member of the overrunning clutch, of which the portion 12 forms one part, comprises a cammed member 18 which is splined to or has a toothed engagement, as at 19, with the end of the drive shaft 2, being thereby rotatively fixed on the drive shaft. Interposed between the members 12 and 18 are clutch rollers 20, the arrangement of the cams on the member 18 being such that when the driven shaft 3 tends to operate at a speed greater than that of the driving shaft 2, the clutch will overrun; but when the driving shaft 2 becomes a driving member, there will be a tendency for the clutch to engage.

Associated with the ring gear 16 is a sun gear 21 surrounding the drive shaft 2 and having a toothed engagement, as at 22, with the front wall of the casing. Suitable split rings 24 engaging in the notches in the teeth of the sun gear and disposed on either side of the wall 23 prevent axial displacement of the sun gear. Preferably this toothed connection between the wall 23 and the sun gear 21 is a slightly loose connection, so that to a limited extent there may be a radial displacement of the free end of the sun gear.

Interposed between the sun gear and the ring gear is a plurality of pinion gears 25 adapted to mesh respectively with the teeth of the sun gear and the teeth of the ring gear. These pinions are rotatably mounted on hollow stub shafts 26 secured in a pinion cage 27 at one end, and in a ring portion 28 of said pinion cage at the other end. This pinion cage has a splined or toothed connection at 29 with the driving shaft 2 and, on the periphery of its hub, this cage is provided with a series of dog-receiving notches 30.

The front face of the hub 11 is provided with a radial recess or notch 31, in radial alignment with the notches or recesses 17 in the ring gear member 13 and with the notches 30 in the hub of the pinion cage 27. This recess receives a radially movable dog 32 having its outer edge 33 and its inner edge 34 cammed in a counter-clockwise direction. This dog is biased in its retracted position, and in a position to engage in one of the notches 30, by a spring 35. This spring is coiled around a fixed pin 36 secured in a recess in the head 11, and one end 37 of the spring engages in an opening 38 in the dog 32. The opposite end of this spring bears in a notch at one end of pin 39, the opposite end of which is tapered, as at 40, on two sides thereof, which taper fits within a notch in the end of an adjusting screw 41. By adjusting the screw 41 it is apparent that the tension of the spring 35 may be varied to suit the desired conditions.

In operation, the dog 32 is normally retracted into a position wherein it is in engagement with one of the notches 30. Therefore, a direct drive will be established from the driving shaft 2 through the pinion cage hub 27, the dog 32, the head 11, to the driven shaft 3. Under these circumstances, the ring gear 16 is in disconnected relation to the head 11, and, therefore to the driven shaft 3, so that, although the pinion cage is being rotated by the driving shaft 2, therefore causing a rotation of the pinions 25 and a rotation of the ring gear 16, this movement of the ring gear 16 will have no effect on the driven shaft. When, however, the speed of the driven shaft reaches a predetermined point or the point at which the centrifugal force will cause the dog 32 to move radially outward against the action of the spring 35, the dog will be moved out of engagement in one of the recesses 30 and in a position to engage in one of the notches 17 of the ring gear member 13. Due to the driving effect of the shaft 2 on the ring gear under these circumstances, the ring gear 16 will be rotating at a greater speed than that of the head 11, and, of course, the dog 32. Due to the cammed shape of the outer end of the dog, this dog will ratchet past the recesses and no engagement of the dog in the recesses will take place. As soon, however, as the speed of the driving shaft 2 is reduced to the point where the ring gear member 13 is rotating in substantial synchronism with the head 11 and the dog 32, the dog will slip into one of the dog openings 17 in the ring gear member and driving relation between the driving shaft 2 and the driven shaft 3 will be established through the planetary gear drive with the driving shaft 2 operating at a considerably lower speed than that of the driven shaft 3.

If, at any time, it is desirable to drop back into the direct drive relation between the shaft 2 and the shaft 3, it is merely necessary to lower the speed at which the shaft 3 is being driven to the point at which the centrifugal force will not be sufficiently great to overcome the spring 35 and the dog 32 will be retracted under the influence of the spring 35 into a position to engage in one of the recesses 30 and as soon as the two shafts approach substantial synchronism the dog will drop into engaging position to establish a direct drive.

Under ordinary circumstances, the above is the normal operation of the device. However, there may be a time at which the dog 32 is thrown outwardly under the influence of centrifugal force to disenage it from the hub of the cage 27, and the speed of the driving shaft instead of being decelerated to permit engagement of the dog in one of the recesses or notches 17, is accelerated. Under these circumstances if there were not the provision of the overrunning clutch, there would be no driving connection established between the driving and driven shafts. The overrunning clutch, therefore, provides for an emergency driving connection between the driving and driven shafts, if for any reason the dog 32 should not engage in one of the notches or recesses 17.

The sun pinion and ring gear are of the helical type which, together with the "free" connection between the sun gear and the casing, provide for extremely quiet operation of the gearing during operation.

In the structure illustrated in Fig. 6, I have shown an additional dog 42, similar in construction and operation to the dog 32. This additional dog 42 is biased in its retracted position through the instrumentality of a spring 43 coiled on a pin 44 and having one end bearing on an adjustment pin 45, in turn bearing upon an adjustment screw 46, the construction being similar to the tensioning arrangement for the dog 32. In actual operation, I find that it is preferable to have the adjustment of one of the springs 37 and 43 different than that of the other, so that one of the dogs will throw out into engaging position sooner than the other. The spring 43, for instance, might be tensioned to throw out when the speed of the vehicle reaches, say, 40 miles an hour, and the spring 37 tensioned so that the dog 32 will throw out when the vehicle reaches a speed of, say, 45 miles an hour. Bear in mind, however, that the dog 42 would not be actually engaged in its notch until after the dog 32 had thrown out, due to the fact that there is a comparatively wide difference in the relative speed of the member 13 and the dog, and it is only when the speed of the dog member or head 11 and the ring gear member 13 approach synchronism that the dogs will engage. Likewise, due to the fact that the tension of the spring 37 is greater than the tension of the spring 43, the dog 32 will disengage sooner than the dog 42. However, due to the construction of the inner face of the dog, the dog 32 will not engage until the hub 27 and the head 11 reach substantial synchronism, and by this time the dog 42 will disengage.

In some instances it is desirable to provide blocking means for the dog 32 or even for both of the dogs 32 and 42, although in the structure illustrated I have only shown it as applied to the one dog construction. In order to accomplish this, I provide a blocking spring 47 which is split and the split ends separated a sufficient distance to receive the dog 32. This spring clamps around the hub 27 with a certain amount of frictional engagement with the hub and is permitted a limited movement relative to the hub by a pin 48 operating in an elongated slot 49 in the spring.

A similar spring 50 surrounds the head 11, being split and having its split ends spaced to accommodate the dog 32. This spring has an expansion friction bearing on the ring gear member 13 and is given a limited movement relatively thereto by an elongated slot 51 in which engages the opposite ends of the pin 48.

Bearing in mind that Fig. 7 is a sectional view looking at the structure from the rear, after the dog 32 has thrown out into engaging position when the operator reduces the speed of the driving shaft to insure engagement of the dog in one of its notches in the member 13, there will be a relative movement between the hub 27, on which the spring 47 is mounted, and the head 11, so that the spring will tend to move in a clockwise direction, looking at Fig. 7, to the limit of its slot 49 and project one end of the spring into the path of the dog, preventing it from returning into engagement in its notch in the hub 27. However, as soon as the speed of the parts becomes such that the dog will engage in one of the notches 17, the hub 27 will be rotating slower than the member 13 and as soon as the speed of the vehicle is allowed to drop down below the throw out speed of the dog and the dog moves out of its engaging position in the slot 17, the speed of the head will then commence to approach synchronism with the speed of the hub 27, dragging the spring back to its initial position, so that the dog may re-engage.

A spring 50 operates in substantially the same manner. Under normal conditions with the member 13 disengaged from the head 11, the member 13 will be rotating at a greater speed than the head 11, tending to drag the spring to the limit of its notch 51 and blocking the dog receiving notch 17. As the parts tend to approach synchronism, however, in order to permit the dog 32 to engage, the spring will be dragged free, so that the notch will be free to receive the dog 32.

I have illustrated a further modification in Fig. 7, wherein I have provided a roller 52 on which the end of the tensioning spring 37 is adapted to bear. I find that this rolling action between the spring and the dog has a tendency to reduce the friction to such an extent that a surer action of the spring is provided.

The present application is a continuation of my copending application for Overdrive transmission, filed June 6, 1935, bearing Serial No. 25,261, allowed April 26, 1940.

I claim as my invention:

1. The combination, with a driving shaft and a driven shaft, of a planetary gearing for driving said driven shaft at a different speed than that of the driving shaft and including a stationary sun gear and a ring gear having a clutch member drivingly associated therewith, and a centrifugally operated clutch having one member drivingly associated with the driving shaft and another member drivingly associated with the driven shaft, one of said members in one position directly connecting said driving and driven shafts to establish a direct drive between said shafts and in another position engaging said ring gear clutch member to connect said ring gear to said driven shaft and establish a drive for said driven shaft through said gearing.

2. The combination, with a driving and driven shaft, of a planetary gearing for driving said driven shaft at a different speed than that of the driving shaft and including a stationary sun gear and a ring gear, and a centrifugally operated clutch, including a clutch member connected to the driving shaft, a clutch member connected to the ring gear, and a centrifugally operated clutch member connected to the driven shaft and which, when in its retracted position, engages the driving shaft clutch member to establish a direct drive between said shafts, and in its projected position, engages the ring gear clutch member to establish a drive between said shafts through said gearing.

3. The combination, with a driving shaft and a driven shaft, of a planetary gearing including a stationary sun gear and a ring gear having a clutch member associated therewith, and a centrifugally operated clutch having one member drivingly associated with the driving shaft and another member drivingly associated with the driven shaft, one of said members engaging said ring gear clutch member to connect said ring gear to the driven shaft when the speed of the driven shaft reaches a predetermined point and directly connecting said shafts when the speed of the driven shaft falls below a given point.

4. The combination, with a driving shaft and a driven shaft, of a planetary gear for driving said driven shaft at a different speed than that of the driving shaft and including a ring gear and a pinion gear cage, a hub on said cage drivingly connected with said driving shaft and forming one member of a clutch, a second member of a clutch drivingly connected to the ring gear, and a centrifugally operated clutch member drivingly connected to the driven shaft and engageable with either of said first-mentioned clutch members.

5. The combination, with a driving shaft and a driven shaft, of a planetary gearing including a stationary sun gear and a ring gear having a clutch member and a centrifugally operated clutch having one member drivingly associated with the driving shaft and another member drivingly associated with the driven shaft, one of said members having means engaging said ring gear clutch member to connect said ring gear to the driven shaft when the speed of the driven shaft reaches a predetermined point and directly connecting said shafts when the speed of the driven shaft falls below a given point, and means for adjusting the point at which said means will operate in either direction.

6. The combination, with driving and driven shafts axially stationary and one piloted in the other, of a planetary gearing for driving the driven shaft at a speed different from that of the driving shaft, including a stationarily mounted sun gear, pinion gears, a pinion carrier connected to the driving shaft, and a ring gear rotatably mounted on the driven shaft, and a centrifugally operated clutch having one member drivingly associated with the driving shaft and another member drivingly associated with the driven shaft and including means for rotatably locking said ring gear on said driven shaft.

7. The combination, with driving and driven shafts axially stationary and one piloted in the other, of a planetary gearing including a stationarily mounted sun gear, pinion gears, a pinion gear carrier connected to the driving shaft, and a ring gear rotatably mounted on said driven shaft, a clutch member connected to the driving shaft, a second clutch member connected to the ring gear, and a centrifugally operated clutch member mounted on said driven shaft for engagement with either of said first two clutch members.

8. The combination, with a driving and a driven shaft having an annular rim overhanging said driving shaft and provided with a radial slot, a centrifugally operated radially movable dog in said slot, a ring gear rotatably mounted on said rim and overhanging the driving shaft, and having dog-engageable portions in radial alignment with said dog, a sun gear stationarily mounted and surrounding said driving shaft, pinion gears between said sun and ring gears, and a pinion carrier connected to said driving shaft and having a portion projecting within said rim and provided with dog-engageable portions in radial alignment with said dog whereby said dog may, in one position, lock said ring gear to said rim and, in another position, directly connect said driving and driven shafts.

9. The combination, with a driving and driven shaft, a head on said driven shaft having an annular rim overhanging said driving shaft and provided with an internal overrunning clutch surface and a radial slot, a centrifugally operated dog radially movable in said slot, a ring gear rotatably mounted on said head and overhanging the driving shaft and having dog-engageable portions in radial alignment with said dog, a sun gear stationarily mounted and surrounding said driving shaft, pinion gears between said sun and ring gears, a pinion carrier connected to said driving shaft and having a portion projecting within said rim and provided with dog-engageable portions in radial alignment with said dog whereby said dog may, in one position, lock said ring gear to said head and, in another position, directly connect said driving and driven shafts, a second overrunning clutch member surrounded by said rim connected to the driving shaft and provided with overrunning clutch surfaces and roller clutch members interposed between the two members of said overrunning clutch.

10. The combination, with a driving shaft and a driven shaft, of a planetary gearing for driving said driven shaft at a different speed than that of the driving shaft, a centrifugally operated clutch having one member drivingly associated with the driven member and another member drivingly associated with the planetary gearing for establishing a drive between said shafts through said gearing, and blocking means for preventing the engagement of the members of said clutch moved into blocking engagement by the relative movement between the clutch members and out of blocking position when the clutch members approach synchronism.

11. The combination, with a driving shaft and a driven shaft, of a planetary gearing for driving said driven shaft at a different speed than that of the driving shaft, and including a stationary sun gear and a ring gear, a centrifugally operated clutch which in one position directly connects said driving and driven shafts to establish a direct drive between said shafts and in another position connects the ring gear to the driven shaft to establish a drive for said driven shaft through said gearing, and blocking means for preventing the operation of said clutch for directly connecting said shafts moved into operative position by the relative movement between the members of the clutch and out of operative position by the approach of said members to synchronism.

12. The combination, with a driving shaft and a driven shaft, of a planetary gearing for driving said driven shaft at a different speed than that of the driving shaft and including a stationary gear and a ring gear, dog engageable members on said ring gear, dog engageable members on said driving shaft, a radially movable dog for engagement with either of said members on said driven shaft, and blocking means moved into blocking position between said dog-engaged members on the driving shaft and said dog when the dog is moved radially outward into engaging position for engagement with the dog engaged members on the ring gear.

13. In a drive for a motor vehicle having a power driving shaft and a shaft driven therefrom and adapted to drive said vehicle, overdriving means including planetary gearing between said shafts for driving said driven shaft at a speed greater than the speed of the driving shaft, said planetary gearing including a plurality of gear elements one of which is an annulus gear element, means providing a non-releasable drive connection between said driving shaft and another gear element of said planetary gearing, and a speed responsive clutch controlling said overdriving means, said clutch including clutching structures respectively drivingly connected to the driven shaft and to the annulus gear element of said planetary gearing, said clutch being adapted to automatically connect said shafts through said planetary gearing.

14. In a drive for a motor vehicle having a power driving shaft and a shaft driven therefrom and adapted to drive said vehicle, overdriving means including planetary gearing between said shafts for driving said driven shaft at a speed greater than the speed of the driving shaft, said planetary gearing including a plurality of gear elements one of which is an annulus gear element and another of which is a planetary gear element having a carrier therefor, means providing a continuous driving connection between said driving shaft and the carrier for said planetary gear element, and a speed responsive clutch controlling said overdriving means, said clutch including clutching structures respectively drivingly connected to the driven shaft and to the annulus gear element of said planetary gearing, said clutch being adapted to automatically connect said shafts through said planetary gearing in response to a predetermined speed of rotation of at least one of said shafts.

15. The combination with a driving shaft and a driven shaft, of a planetary gearing for driving said driven shaft at a speed different from that of the driving shaft and including a ring gear having a clutch member drivingly associated therewith, a stationary sun gear, centrifugally operated clutching means drivingly associated with one of said shafts adapted to engage said ring gear clutch member for connecting the ring gear to the driven shaft to establish a drive between said shafts through said gearing, centrifugally controlled means drivingly associated with one of said shafts, and means drivingly associated with the other of said shafts for cooperation with said centrifugally controlled means for directly connecting said shafts to establish a direct drive therebetween.

16. The combination with a driving shaft and a driven shaft, of a planetary gearing for driving said driven shaft at a different speed from that of the driving shaft and including a stationarily mounted sun gear, and a ring gear having a clutch member drivingly associated therewith, a centrifugally operated clutch member drivingly associated with one of said shafts adapted to engage said ring gear clutch member for connecting the ring gear to the last mentioned shaft when the clutch member is in its projected position, a centrifugally controlled clutch member drivingly associated with one of said shafts and a second clutch member drivingly associated with the other of said shafts and engageable by said centrifugally controlled clutch member for directly connecting said shafts when said second clutch member is in its retracted position.

17. Power transmission mechanism including a driving shaft, a toothed clutch member coaxial therewith and connected to rotate therewith, a gear train driven from said driving shaft and including a gear coaxial with said shaft and rotating at a speed different from that of said shaft, a second clutch member arranged to rotate with said gear, a driven shaft coaxial with the driving shaft, a coupling member rotating with said driven shaft and arranged to couple said driven shaft to either the first-named or the second-named clutch member, centrifugal weights carried by said coupling member and operable to urge it to coupling relation with one of said clutch members, spring means arranged to urge the coupling member toward coupling relation with the other of said clutch members, and means arranged to positively block the coupling member after it has been moved out of coupling relation with either clutch member and prevent it from coupling with the other clutch member until the speed of the driving shaft has been changed to bring the speed of such other clutch member to substantially that of the coupling member.

18. Power transmission mechanism including a driving shaft, a toothed clutch member coaxial therewith and connected to rotate therewith, a gear train driven from said driving shaft and including a gear coaxial with said shaft and rotating at a speed different from that of said shaft, a second clutch member arranged to rotate with said gear, a driven shaft coaxial with the driving shaft, a coupling member rotating with said driven shaft and arranged to couple said driven shaft to either the first-named or the second-named clutch member, centrifugal weights carried by said coupling member and operable to urge it to coupling relation with one of said clutch members, spring means arranged to urge the coupling member toward coupling relation with the other of said clutch members, and means arranged to positively block the coupling member after it has been moved out of coupling relation with either clutch member and prevent it from coupling with the other clutch member until the speed of the driving shaft has been changed and consequently the relative rotary movement between the coupling member and such other clutch member reversed in direction.

19. Power transmission mechanism including a driving shaft, a driven shaft coaxial therewith, a planetary gear train comprising a stationary sun gear, an internal ring gear and a set of planetary pinions, a carrier for the pinions connected to rotate with one of said shafts, a clutch member rotating with said one shaft, a shiftable clutch member connected to rotate with the other shaft, a clutch member carried by the ring gear, speed-responsive means driven at a speed proportional to that of the driven shaft, said speed-responsive means being arranged to cause the shiftable clutch member to couple with the first-named clutch member and thereby connect the two shafts together directly or to couple with the clutch member carried by the ring gear so as to cause the driven shaft to be driven through the planetary gear train, and means for controlling the speed-responsive means so arranged that the driven-shaft speed at which the shift is made in one direction overlaps that at which the shift is made in the other direction.

20. Power transmission mechanism including a driving shaft, a toothed clutch member coaxial therewith and connected to rotate therewith, a planetary gear train driven from said driving shaft and including a ring gear coaxial with said driving shaft and rotating at a speed higher than that of said shaft, a second clutch member carried by said ring gear, a driven shaft coaxial with the driving shaft, a coupling member rotating with the driven shaft and arranged to couple said driven shaft to either the first-named or the second-named clutch member, centrifugal weights carried by said coupling member and operable to urge it to coupling relation with the second-named clutch member, spring means arranged to urge the coupling member toward coupling relation with said first-named clutch member, and means arranged to block the coupling member after it has been moved out of coupling relation with either clutch member and prevent it from coupling with the other clutch member until the relative rotary movement between itself and such other clutch member reverses its direction.

21. Power transmission mechanism including a driving shaft, a clutch member coaxial therewith and connected to rotate therewith, a gear train driven from said driving shaft and including a gear coaxial with said shaft and rotating at a speed different from that of said shaft, a second clutch member arranged to rotate with said gear, a driven shaft coaxial with the driving shaft, a coupling device rotating with said driven shaft and arranged to couple said driven shaft to either the first-named or the second-named clutch member and including centrifugal means operable to urge it to coupling relation with the faster-rotating of said clutch members, said coupling device including also spring means arranged to urge it toward coupling relation with the other of said clutch members, and means arranged to positively block the coupling device after it has moved out of coupling relation with either clutch member and prevent it from coupling with the other clutch member until the speed of the driving shaft has been changed to bring the speed of such other clutch member to substantially that of the coupling device.

22. Power transmission mechanism including a driving shaft, a clutch member coaxial therewith and connected to rotate therewith, a gear train driven from said driving shaft and including a gear coaxial with said shaft and rotating at a speed different from that of said shaft, a second clutch member arranged to rotate with said gear, a driven shaft coaxial with the driving shaft, a coupling device rotating with said driven shaft and arranged to couple said driven shaft to either the first-named or the second-named clutch member, said coupling device including centrifugal means operable to urge it toward coupling relation with the faster-rotating clutch member, said coupling device including also spring means arranged to urge it toward coupling relation with the other of said clutch members, and means arranged to block the coupling device after it has moved out of coupling relation with either clutch member and prevent it from coupling with the other clutch member until the speed of the driving shaft has been changed and consequently the relative rotary movement between the coupling device and such other clutch member is reversed in direction.

23. Power transmission mechanism including a driving shaft, a clutch member coaxial therewith and connected to rotate therewith, a gear train driven from said driving shaft and including a gear coaxial with said shaft and rotating at a speed different from that of said shaft, a second clutch member arranged to rotate with said gear, a driven shaft coaxial with the driving shaft, a coupling device rotating with said driven shaft and arranged to couple said driven shaft to either the first-named or the second-named clutch member, said coupling device including centrifugal means rotating coaxially with said shafts and operable to urge it toward coupling relation with the faster-rotating clutch member, said coupling device including also spring means arranged to urge the coupling device toward coupling relation with the other of said clutch members, and means arranged to positively block the coupling device after it has moved out of coupling relation with either clutch member and prevent it from coupling with the other clutch member until the speed of the driving shaft has been changed and consequently the relative rotary movement between the coupling device and such other clutch member is reversed in direction.

24. In a power transmission for automotive vehicles, a driving shaft, a driven shaft, a relatively slow speed driving means for driving the vehicle from said driving shaft, a relatively fast speed driving means for driving said driven shaft at a speed greater than that of the slow speed driving means and including a pair of relatively rotatable structures, at least one of which is adapted for rotational change from one direction to the opposite direction relative to any point on the other structure, one of said structures carrying a dog adapted to be projected from a disengaging position to an engaging position, the other of said structures having a slot adapted to be engaged by said dog when projected into engaging position to lock said structures together against relative rotation and establish said fast speed drive, and means supported by one of said structures and engaging the other of said structures for releasably preventing the dog from projecting to said engaging position, said preventing means, in response to a change of direction of relative rotation of the structures, operating to release the dog for projection into engaging position.

25. In a power transmission for automotive vehicles, a driving shaft, a driven shaft, a relatively slow speed driving means for driving the vehicle from said driving shaft a relatively fast speed driving means for driving said driven shaft at a speed greater than that of the slow speed driving means and including a pair of relatively rotating structures, at least one of which is adapted for rotational change from one direction to the opposite direction relative to any point on the other of said structures, one of said structures carrying a dog adapted to be projected from disengaging position to engaging position, the other of said structures having a slot adapted to be engaged by said dog when projected into engaging position to lock said structures together against relative rotation and establish said fast speed drive, a latching element supported by one of said structures and engaging the other of said structures, said latching element preventing the dog against projection into said engaging position and said latching element moving to release the dog for projection into engaging position in response to the change in direction of relative rotation of said structures.

26. In a power transmission for automotive vehicles, a driving shaft, a driven shaft, a relatively slow speed driving means for driving the vehicle from said driving shaft, a relatively fast speed driving means for driving said driven shaft at a speed greater than the slow speed driving means and including a pair of relatively rotatable structures, at least one of which is adapted for rotational change from one direction to the opposite direction relative to any point on the other of said structures, one of said structures carrying a dog adapted to be projected from a disengaging position into an engaging position, the other of said structures having a slot adapted to be engaged by said dog when the same is projected into engaging position to lock said structures together against relative rotation, a ring surrounding said slotted structure having an opening adapted to coincide with the slot in said slotted structure, said ring being movable by frictional engagement between the parts to move the slot therein out of coincidence with the slot in the slotted structure to prevent the dog from projecting into said slot and being movable by frictional engagement between the parts to move a slot into coincidence with the slot of said structure in response to relative directional change of rotation of said structure to permit said dog to enter the slot of said slotted structure and lock the structures together against relative rotation and establish said fast speed drive.

27. In a power transmission for automotive vehicles, a driving shaft, a driven shaft, a relatively slow speed driving means for driving the vehicle from said driving shaft, a relatively fast speed driving means for driving said driven shaft at a speed greater than that of the slow speed driving means and including a pair of relatively rotatable structures, at least one of which is adapted for rotation changing from one direction to the opposite direction relative to any point on the other of said structures, one of said structures carrying a dog and adapted to be projected from disengaging position into an engaging position, the other of said structures having a slot adapted to be engaged by said dog when the same is projected into engaging position to lock said structures against relative rotation and establish said fast speed drive and a ring interposed between said structures having an opening adapted to coincide with the slot in said slotted structure, said ring being movable by frictional engagement between the parts to move the slot therein out of coincidence with the slot in the slotted structure to prevent the dog from projecting into said slot and being movable by frictional engagement between the parts to move its slot into coincidence with the slot of said structure in response to a relative directional change of rotation of said structures to permit said dog to enter the slot of said slotted structure and lock the structures together against relative rotation.

28. In a power transmission for automotive vehicles, a driving shaft, a driven shaft, a relatively slow speed driving means for driving the vehicle from said driving shaft, a relatively fast speed driving means for driving said driven shaft at a speed greater than that of the slow speed driving means and including a pair of relatively rotatable structures relatively drivingly connected to a driving member and a driven member, at least one of said structures being adapted for rotational change from one direction to the opposite direction relative to any point on the other of said structures, one of said structures carrying a dog adapted to be projected from a disengaging position to an engaging position, the other of said structures having a slot adapted to be engaged by said dog when projected into engaging position to lock said structures together against relative rotation, means supported by one of said structures and engaging the other of said structures for preventing the dog from projecting to said engaging position, said preventing means, in response to a change in directional relative rotation of the structures, operating to release the dog for projection into engaging position, and automatically operated clutch means for driving the driven shaft from the driving shaft during the interval said dog is prevented from projecting into said engaging position.

29. In a power transmission for automotive vehicles, a driving shaft, a driven shaft, a relatively slow speed driving means for driving the vehicle from said driving shaft, a relatively fast speed driving means for driving said driven shaft at a speed greater than that of the slow speed driving means and including a pair of relatively rotatable structures, at least one of said structures being adapted for rotation changing from one direction to the opposite direction relative to any point on the other of said structures, one of said structures carrying a dog adapted to be projected from disengaging position to engaging position, the other of said structures having a slot adapted to be engaged by said dog when projected into engaging position to lock said structures together against relative rotation and establish said fast speed drive, a latching element supported by one of said structures and preventing the dog against projection into said engaging position and said latching element moving to release the dog for projecting into engaging position in response to the change in directional relative rotation of said structures and automatically operating clutching means for driving the driven shaft from the driving member during the interval said dog is prevented from projecting into said engaging position.

30. In a power transmission for automotive vehicles, a driving shaft, a driven shaft, a relatively slow speed driving means for driving the vehicle from said driving shaft, a relatively fast speed driving means for driving said driven shaft at a speed greater than that of the slow speed driving means and including a pair of relatively rotatable structures, at least one of said structures being adapted for rotational change from one direction to the opposite direction relative to any point on the other of said structures, one of said structures carrying a dog adapted to be projected from a disengaging position to an engaging position, the other of said structures having a slot adapted to be engaged by said dog when projecting into engaging position to lock said structures together against relative rotation, and a ring supported by said slotted structure having a slot preventing the dog from projecting into said first-mentioned slot, said ring being removed into released position to permit said dog to enter said first-mentioned slot in response to a relative directional change of rotation of said structure having said dog-receiving slot and automatically operating clutch means for driving the driven shaft from the driving shaft during the interval the dog is prevented from projecting into said receiving slot.

31. In a power transmission for automotive vehicles, a driving shaft, a driven shaft, a relatively slow speed driving means for driving the vehicle from said driving shaft, a relatively fast speed driving means for driving said driven shaft at a speed greater than that of the slow speed driving means and including a pair of relatively rotatable structures, at least one of which is adapted for rotation changing from one direction to the opposite direction relative to any point on the other of said structures, one of said structures carrying a dog adapted to be projected from a disengaging position into an engaging position, the other of said structures having a slot adapted to be engaged by said dog when projected into engaging position to lock said structures together against said relative rotation and establish said fast speed drive, a ring supported by said slotted structure and provided with a slot adapted to coincide with the dog-receiving slot in said structures, said ring being movable relatively to said slotted member for a limited distance to block the entry of said dog into the slot of said member and being movable in response to a relative directional change of rotation of said slotted structure to permit said dog to enter said shot, said slow speed driving means including an automatically operated clutch means for driving the driven shaft from the driving shaft during the interval said dog is prevented from engaging in said slot.

32. In a power transmission for automotive vehicles, a driving shaft and a driven shaft, a relatively slow speed driving means for driving the vehicle from said driving shaft, a relatively fast speed driving means for driving said driven shaft at a speed greater than that of the slow speed driving means and including a pair of relatively rotatable structures, at least one of which is adapted for rotational change from one direction to the opposite direction relative to any point on the other of said structures, one of said structures carrying a dog adapted to be projected from a disengaging position into an engaging position, the other of said structures having a slot adapted to be engaged by said dog when the same is projected into engaging position to lock said structures together against relative rotation and establish said fast speed drive, and a ring interposed between said structures and having an opening adapted to coincide with the slot in said slotted structure, said ring being movable by frictional engagement between the parts to move the slot therein out of coincidence with the slot in the slotted structure to prevent the dog from projecting into said slot and movable by frictional engagement between the parts to move its slot into coincidence with the slot of said structures in response to a relative directional change of rotation of said structures to permit said dog to enter the slot and lock the structures against relative rotation, said slow speed driving means including automatically operating clutch means for driving the driven shaft from the driving shaft during the interval said dog is prevented from engaging said slot.

WILLIAM B. BARNES.